United States Patent [19]

Scarmoutzos et al.

[11] Patent Number: 5,286,382

[45] Date of Patent: Feb. 15, 1994

[54] HYDROPHOBIC POLYMERIC MEMBRANE COMPOSITES

[75] Inventors: Louis M. Scarmoutzos, Andover; John Charkoudian, Carlisle, both of Mass.

[73] Assignee: Millipore Corporation, Bedford, Mass.

[21] Appl. No.: 12,112

[22] Filed: May 17, 1993

Related U.S. Application Data

[62] Division of Ser. No. 852,584, Mar. 17, 1992, Pat. No. 5,217,802.

[51] Int. Cl.$^5$ .............................................. B01D 29/00
[52] U.S. Cl. ............................... 210/490; 210/500.42; 210/500.41; 427/244; 427/245; 427/508; 428/306.6; 428/315.7; 428/319.7; 521/53; 521/57; 521/134; 521/138
[58] Field of Search ...................... 210/500.42, 500.41, 210/490; 428/306.6, 315.7, 319.7; 427/244, 245, 508; 521/53, 57

[56] References Cited

U.S. PATENT DOCUMENTS 4,954,256  9/1990  Degen et al. ......................... 521/53

Primary Examiner—Morton Foelak
Attorney, Agent, or Firm—Andrew T. Karnakis; Paul J. Cook

[57] ABSTRACT

A composite porous membrane is formed from a porous polymeric substrate having its entire surface modified with a cross-linked polymer which results in a hydrophobic and oleophobic surface. The composite membrane retains substantially all of its other original properties. The cross-linked polymer is formed in situ on the polymeric substrate from a reactant system comprising an ethylenically unsaturated monomer having at least one fluoroalkyl group, a cross-linker, and, if needed, a polymerization initiator, dissolved in a nonpolar and or weakly polar solvent system. The membrane substrate saturated with the reactant system is exposed to a suitable energy source to effect polymerization and cross linking of the monomer.

14 Claims, 1 Drawing Sheet

HYDROPHOBIC POLYMERIC MEMBRANE COMPOSITES

This is a divisional of copending application Ser. No. 07/852,584 filed Mar. 17, 1992, now U.S. Pat. No. 5,217,802.

BACKGROUND OF THE INVENTION

This invention relates to a porous membrane having both a hydrophobic (water repellent) and oleophobic (oil repellent) surface. More particularly, this invention relates to a microporous or ultrafiltration membrane modified to produce a hydrophobic/oleophobic surface including the membrane pore surfaces and to a process for forming such a membrane.

Polytetrafluoroethylene (PTFE) has been the most commonly used material in membranes utilized to vent gases. The chemical and biological inertness, thermal stability, and hydrophobicity inherently associated with PTFE has led to the development of PTFE as the material of choice in industrial gas vent applications. PTFE membranes have also found widespread use in the health and related industries. The necessity of producing aseptic vent membranes for use in medical/biological devices has also naturally led to the selection of PTFE as the choice material in membrane applications. Traditionally, aseptic materials have been generated by chemical sterilization, notably by steam treatment or treatment with ethylene oxide. The compatibility of PTFE with sterilizing chemicals and treatments, especially at elevated temperatures, is a well known material property characteristic of PTFE. A problem sometimes encountered with the use of PTFE as a vent membrane material under steam treatment is pore blockage either due to condensation of oil, from the machinery used to generate the steam, or water or both. The resulting loss of air permeability of the clogged membrane effectively reduces the membrane's utility as a gas vent. This condensation problem has led to the search and development of more hydrophobic and oleophobic membrane materials as substitutes for PTFE. A more acute problem concerns the chemical sterilization of membrane materials for use under aseptic conditions. Chemical sterilization, particularly with ethylene oxide, very often generates additional issues such as toxicity and waste disposal that raises serious health, environmental and economic concerns. These concerns have led to the widespread use of ionizing radiation for sterilization of materials used in medical and biological devices. A major disadvantage of PTFE is its inherent instability towards ionizing irradiation. Ionizing irradiation of PTFE membranes results in the undesirable property of reduced mechanical strength. This loss of mechanical strength places severe restrictions in the use of PTFE membranes under moderate pressures.

Coating of materials allows one to retain the desirable bulk materials properties while only altering the surface and interfacial properties of the substrate. Hydrophobic and oleophobic coatings have found popular use in the electronics industry as protective barriers for sensitive electronic components. Although expensive, coating solutions are commercially available. Coating membranes has not been a very practical approach for modifying the surface properties of membranes since the tortuous morphologies associated with membranes rarely lend themselves to a continuous and even coating. Furthermore, since coatings are not permanently anchored (bonded) to the underlying substrate, very often the coated materials are susceptible to wear and extraction thereby having a rather limited range of thermal and chemical compatibility. In addition, coatings adversely affect the permeability properties of porous substrates.

It also has been proposed to utilize grafting techniques to modify the surface characteristics of a polymer substrate. Typical examples of grafting techniques are shown, for example, in U.S. Pat. Nos. 3,253,057; 4,151,225; 4,278,777 and 4,311,573. It is difficult to utilize presently available grafting techniques to modify the surface properties of porous membranes. This is because it is difficult to modify the entire surface of the membrane including the surfaces within the pores while avoiding pore blockage and while retaining membrane porosity.

It has been proposed in U.S. Pat. No. 4,954,256 to render the surface of a microporous polymeric membrane more hydrophobic by grafting a fluoropolymer to the membrane surface in order to chemically bond the fluoropolymer to the membrane surface. The fluoropolymer is formed from a monomer containing an ethylenically unsaturated group and a fluoroalkyl group. The grafting is effected by exposing the membrane, in a monomeric solution, to ionizing radiation. A typical source of ionizing radiation is a $^{60}$Co gamma radiation source. The fluoropolymer formed from the fluorine-containing ethylenically unsaturated monomer is permanently bonded to the microporous membrane substrate.

European patent application 86307259.1 discloses a process for preparing hydrophobic/oleophobic membranes. The process is not a surface modification; it is an in situ process which, by virtue of a phase separation, both the underlying substrate and hydrophobic surface of the membrane are formed simultaneously by a photopolymerization process. The resulting membrane is weak mechanically and needs to be supported/laminated for use as a vent membrane under relatively moderate pressures. In addition, the process gives rise to membranes with a relatively narrow range of properties since the membrane morphology and surface characteristics are formed simultaneously.

Patent application PCT/US90/04058 discloses a process for preparing hydrophobic and oleophobic porous substrates. The process entails impregnating a porous substrate with a solution of a fluorinated monomer in a carrier solvent, removal of the solvent by evaporation, and then polymerization of the remaining monomer. The process is, in essence, a solid-state polymerization reaction.

U.S. Pat. No. 4,618,533 discloses a process for forming a composite membrane from a porous membrane substrate and a cross-linked, polymerizable monomeric composition coated on the substrate. The monomeric composition includes a polymerizable monomer and a cross-linking agent for the monomer. Any conventional energy source for initiating free radical polymerization can be used to form a cross-linked polymeric coating in situ on the porous membrane such as ultraviolet (UV) light or heat. By this process, a membrane having its surface modified by the cross-linked polymer is produced. No mention is made of forming a cross-linked modified surface from an ethylenically unsaturated monomer having a fluoroalkyl group.

U.S. Pat. No. 5,037,457 discloses a means for enhancing the mechanical strength of gamma irradiated PTFE membranes by laminating the PTFE membrane to a porous polyester web. This approach resolves the practical issue concerning the mechanical stability of gamma irradiated PTFE. The chemical compatibility of the laminated membrane is now limited by the properties of the porous web support. Furthermore, laminates are prone to delamination, particularly laminates formed by the use of adhesives which often are sensitive to gamma radiation.

Accordingly, it would be desirable to provide a porous membrane having a surface which is more hydrophobic and oleophobic than presently available membranes. In addition, it would be desirable to provide such a membrane which retains its mechanical strength after being exposed to sterilizing ionizing radiation.

SUMMARY OF THE INVENTION

This invention provides a composite porous membrane having a hydrophobic/oleophobic polymeric surface formed from a cross-linked ethylenically unsaturated monomer containing a fluoroalkyl group. The polymeric surface is formed by coating the porous membrane substrate with a solution of the monomer, a cross-linking agent for the monomer, and a polymerization initiator, if required. Polymerization is effected by a suitable energy source such as electromagnetic irradiation, thermal sources, and ionizing radiation. The composite product of this invention has substantially all of the original properties as that of the membrane substrate. By the phrase, "substantially all of the original properties as that of the membrane substrate" is meant the characteristics of the unmodified membrane, that is mechanical and membrane properties such as porosity and flow. Composite membrane products of this invention have a hydrophobic/oleophobic surface such that they do not wet with solvents whose surface tensions are greater than approximately 20 dynes/cm. Composite membranes also are produced which pass the more stringent MVI test (described below). In addition, composite membrane products of this invention retain their mechanical strength after being exposed to sterilizing ionizing radiation.

DESCRIPTION OF SPECIFIC EMBODIMENTS

Figure 1:
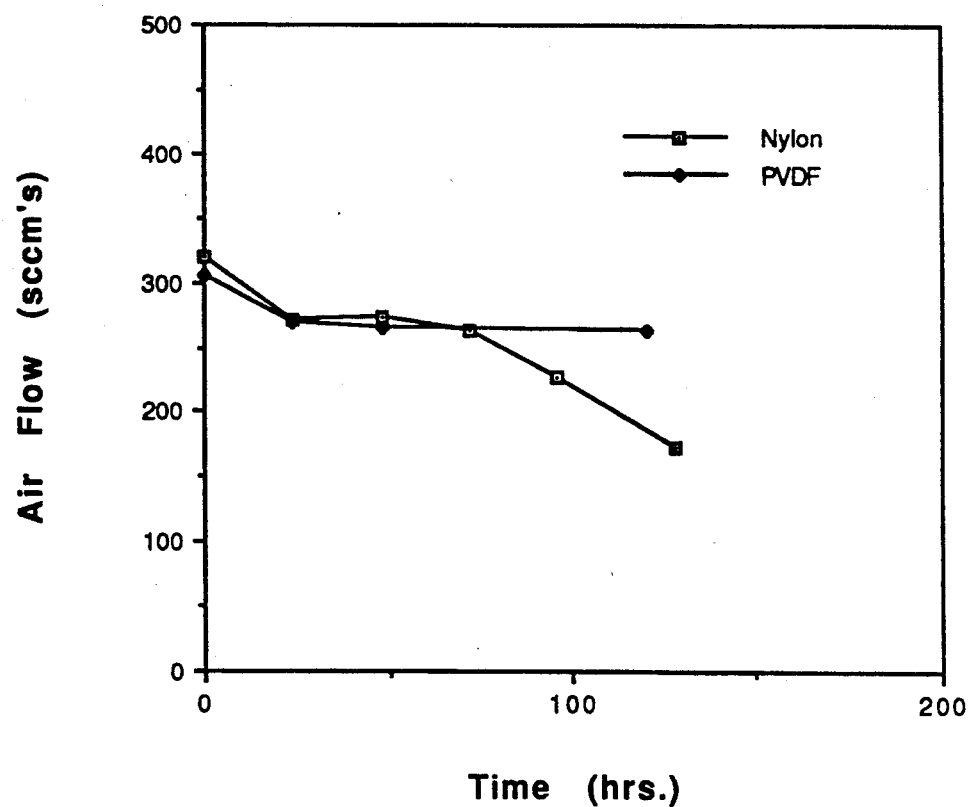
FIG. 1 shows the air permeability as a function of time exposed to MVI testing conditions for the membranes produced in Examples 1 and 2.

In accordance with this invention there is provided a polymeric porous membrane substrate having directly deposited throughout its entire surface a polymerized cross-linked polymer formed in situ from an ethylenically unsaturated monomer having at least one fluoroalkyl group. The desired deposition of the cross-linked, polymerized monomer onto the porous membrane is effected as a direct coating and does not require or utilize an intermediate binding chemical moiety. The term "polymer" as used herein is meant to include polymeric compositions formed from one or more monomers. Representative suitable polymers forming the porous membrane substrate include polyolefins such as polyethylene, polypropylene, polymethylpentene or the like; polyamides; polystyrene or substituted polystyrene; fluorinated polymers including poly(tetrafluoroethylene), polyvinylidene fluoride(PVDF) or the like; polysulfones such as polysulfone, polyethersulfone or the like; polyesters including polyethylene terephthalate, polybutylene terephthalate or the like; polyacrylates and polycarbonates; cellulosics; and vinyl polymers such as poly vinyl chloride and polyacrylonitriles. Copolymers also can be employed such as copolymers of butadiene and styrene, fluorinated ethylene-propylene copolymer, ethylene-chlorotrifluoroethylene copolymer or the like. Generally, the porous membrane substrate has an average pore size between about 0.001 and 10 microns, more usually between about 0.01 and 5.0 microns and preferably between 0.1 and 0.5 microns.

The polymerization and cross-linking of the polymerizable monomer onto the porous membrane substrate is effected so that the entire surface of the porous membrane, including the inner surfaces of the porous membrane, is modified with a cross-linked polymer.

A reagent bath comprised of: (1) a polymerizable monomer which is ethylenically unsaturated and has at least one fluoroalkyl group, (2) a polymerization initiator, if needed, and (3) a cross-linking agent in a solvent for these three constituents, is contacted with the porous membrane substrate under conditions to effect polymerization of the monomer and deposition of the resulting cross-linked polymer onto the porous membrane substrate. When the monomer is difunctional or has higher functionality, an additional cross-linking agent need not be utilized. In accordance with this invention, it has been found necessary to utilize nonpolar or weakly polar solvent systems in order to obtain the requisite degree of membrane surface modification with the cross-linked polymer utilized for the surface modification. It has been found that by choosing the appropriate solvent system, the hydrophobicity and oleophobicity of the modified surface can be controlled such that the modified membrane does not wet with solvents whose surface tension is greater than about 21 dynes/cm and or such that the modified membranes pass the more stringent MVI test. Representative suitable solvents include siloxanes such as hexamethyldisiloxane, octamethyltrisiloxane, or hexamethylcyclotrisilozane or homologs thereof; silicones such as polydimethylsiloxanes or homologs thereof; hydrocarbon alkanes such as octane, isooctane or homologs thereof; aromatics such as benzene and homologs thereof; aralkyls such as toluene, xylenes or homologs thereof. By the phrase, "nonpolar or weakly polar solvent system" is meant solvents that have relatively low dielectric constants. Generally, such solvents possess a dielectric constant of about 20 or less. It has been found that by utilizing the solvent hexamethyldisiloxane or decamethyltetrasiloxane the surface-modified membranes of this invention are capable of passing the MVI test. While the remaining solvents set forth above effect the production of less hydrophobic or oleophobic modified surfaces, the membranes produced therewith are useful as gas filters in less stringent environments.

Representative suitable polymerizable and cross-linkable monomers include fluoroacrylates such as 2-(N-ethylperfluorooctanesulfonamido)ethyl acrylate, 2-(N-ethylperfluorooctanesulfonamido)ethyl methacrylate or homologs thereof; 3,3,4,4,5,5,6,6,7,7,8,8,9,9,10,10,10-heptadecafluorodecyl acrylate, 3,3,4,4,5,5,6,6,7,7,8,8,9,9,10,10,10-heptadecafluorodecyl methacrylate or homologs thereof; fluoroalkylsiloxanes such as tridecafluoro-1,1,2,2-tetrahydrooctyl-1-triethoxysilane or homologs thereof; fluorinated styrenes such as pentafluorostyrene, trifluoromethylstyrene or homologs thereof; fluoroolefins such as perfluorobutylethylene or homologs thereof.

Suitable initiators and cross-linking agents for the monomers set forth above are well known in the art. For example, when utilizing fluoroacrylates as the polymerizable monomer, suitable photopolymerization initiators include benzophenone, 4-(2-hydroxyethoxy)phenyl-(2-hydroxy-2-propyl) ketone, azoisopropane or 2,2-dimethoxy-2-phenylacetophenone or the like. Suitable thermal initiators include organic peroxides such as dibenzoyl peroxide, t-butylhydroperoxide, cumylperoxide or t-butyl perbenzoate or the like and azo compounds such as azobisisobutyronitrile(AIBN) or 4,4'-azobis(4-cyanovaleric acid) or the like. Representative suitable cross-linking agents include 1,6-hexanediol diacrylate, 2,2,3,3,4,4,5,5-octafluorohexanediol-1,6-diacrylate or homologs and the like; 1,1,1-trimethylolpropane triacrylate or the like; divinylbenzene or the like. When utilizing fluorine containing polymerizable monomers having more than one degree of unsaturation, an additional monomer in the coating of this invention need not be added. The monomer, polymerization initiator and cross-linking agents are contacted with the porous membrane as a mixture in a solvent which is compatible with the three reactants and the porous membrane so that the desired free radical polymerization and cross-linking is achieved without the formation of a significant amount of slowly extractable by-products. If readily extractable by-products are formed, these can be removed by conducting a washing step with a suitable solvent subsequent to the coating step.

Generally, the polymerizable monomer is present in the reactant solution at a concentration between about 2% and about 20%, preferably between about 5% and about 10% based upon the weight of the polymerizable monomer. The cross-linking agent is present in an amount of between about 2% and about 10% by weight, based upon the weight of the polymerizable monomer. Greater amounts of cross-linking agents can be used but no significant advantage is gained thereby. The polymerization initiator is present in an amount of between about 1% and about 10% by weight, based upon the weight of the polymerizable monomer. As noted above, the cross-linking agent can be utilized without the monomer and thereby functions as the polymerizable monomer.

Polymerization and cross-linking is effected by exposing the monomer reaction system to ultraviolet(UV) light, thermal sources or ionizing radiation. It is preferred to utilize UV light since processing can be more quickly effected. The process is conveniently effected by dipping the membrane substrate in the solution containing the monomer, cross-linking agent, and the initiator, sandwiching the membrane between two ultraviolet light transparent sheets such as polyethylene and exposing the sandwich to UV light. This process can be effected continuously and the desired cross-linking coating is formed within minutes after UV exposure is initiated. By controlling the reactant concentrations and UV exposure, as set forth above, a composite is produced which is nonplugged and has essentially the same porous configuration as the membrane substrate. Furthermore, the composite membrane produced is wettable only by solvents that have a surface tension of greater than about 21 dynes/cm. That is, the composites of this invention have a highly hydrophobic and oleophobic surface. In addition, some of the composites of this invention are capable of passing the stringent MVI test. Furthermore, composites of this invention retain their mechanical strength even after being exposed to sterilizing ionizing radiation.

The composites of this invention, after being sterilized by exposure to gamma radiation, usually between about 2 and 5 MegaRads are capable of withstanding a forward or reverse pressure of at least 10 psi. In addition, the sterilized membrane composite of this invention retains a desirable degree of hydrophobicity/oleophobicity such that it is not wet by aqueous solutions including solutions containing surfactants. The composites are useful as gas vents to selectively pass gas through while preventing passage of organic and aqueous liquids through such as in the apparatus described in U.S. Pat. No. 3,854,907 which is incorporated herein by reference. Thus, the composites of this invention can be utilized as a seal for organic and aqueous liquids. In addition, the composites of this invention can be utilized as a filter for gases.

MVI TEST

The MVI test is a test protocol established by Millipore Corporation, Bedford, Mass. in order to satisfy the requirements of a vent membrane suitable for use in filtering devices. The vent membrane is a hydrophobic membrane incorporated into a filtering device that allows gas to be selectively vented, i.e. impervious to aqueous solutions, as, for example, when an aqueous MVI solution is filtered through a hydrophilic filter prior to intravenous administration. As an integral part of the filtering device, the vent membrane must remain hydrophobic, i.e. not wet by aqueous solutions, in its use in order to be functional as a gas vent membrane.

MVI solution is an aqueous nutrient solution administered intravenously to ill patients. MVI itself is an abbreviation for Multiple Vitamin Infusion. The nutrient mixture mainly consists of dextrose, essential and nonessential amino acids, water and oil-soluble vitamins, and a surfactant. Smaller amounts of additives are added as preservatives and to adjust for pH. The MVI solution is prepared by mixing 500 mL of a 7% Aminosyn ® Solution (Abbott Laboratories), 500 mL 50% Dextrose Inj., USP (Abbott Laboratories), and 10 mL of a M.V.I. ® Solution (Armour Pharmaceutical Company). Aminosyn ® Solution is an aqueous crystalline amino acid solution containing the essential and nonessential amino acids. Also included in the Aminosyn ® Solution are a preservative(potassium metabisulfite) and pH adjuster(acetic acid). M.V.I. ® Solution is an aqueous solution containing the essential water soluble and water insoluble vitamins. Also included in the M.V.I. ® Solution is a surfactant(polysorbate 20) for solubilizing the water insoluble vitamins, preservatives(butylated hydroxytoluene, butylated hydroxyanisole, and gentisic acid ethanolamine), and pH adjuster(sodium hydroxide).

The MVI test protocol requires exposing the hydrophobic vent membrane to the MVI solution at a pressure of 15 pounds per square inch(psi) for 96 hours. After exposure the vent membrane is tested for air permeability(i.e. resistance to air flow) by measuring the air flow through the vent membrane under a pressure of 5 psi's. A membrane is said to pass the "MVI Test" if it typically retains approximately 50% or more of its original air permeability and does not allow any of the test solution to seep through the membrane. For practical purposes, the remaining air permeability through the vent membrane after a 96 hour MVI test will often be dictated by other filtering device specifications, e.g. venting time. Typical test results of hydrophobic membranes that successfully pass the MVI test are shown as follows:

Figure 1

The MVI test is a more stringent assessment of vent membrane performance under practical conditions than wettability measurements. Wettability measurements (for e.g. advancing and receeding contact angle measurements and variations thereof) only sample a relatively "thin" portion of the membrane, typically the top 10 Å of the membrane surface, and usually do not reflect the hydrophilicity/hydrophobicity of the membrane surfaces in the interior of the porous membrane. The MVI test approach is essentially a "pressurized" wettability/adsorptivity test that allows one to indirectly assess the hydrophilicity and oleophobicity of the interior surfaces of the porous membrane. This pressurized wettability/adsorptivity approach may be extended in its utility to solutions other than aqueous nutrient mixtures in order to assess membrane performance under a variety of working (i.e. venting) conditions.

The following examples illustrate the present invention and are not intended to limit the same.

EXAMPLE 1

A microporous nylon(Nylon 66) membrane having an average pore size of 0.2 microns was dip-coated into a reactant solution containing 2.55 g of 2-(N-ethylperfluorooctanesulfonamido)ethyl acrylate, 0.06 g of 2,2-dimethoxy-2-phenylacetophenone, and 0.22 g of 2,2,3,3,4,4,5,5-octafluorohexanediol-1,6-diacrylate dissolved in 47.75 g of hexamethyldisiloxane(HMDS). The "wet" membrane was sandwiched between two pieces of polyethylene, sealed and irradiated with high intensity ultraviolet(UV) radiation by transporting the membrane through a UV chamber(Fusion Systems, Dual Lamp System with P300 Power Supply Units) at a rate of approximately 15 ft./min. After UV exposure for approximately 30 seconds the membrane was rinsed with isopropanol and then acetone and air-dried to constant weight (weight add-on was approximately 6%). The membranes typically retain approximately 70–95% of their original air permeability after modification. A 96 hour MVI test exposure results in a membrane that typically retains approximately 70–90% of the air permeability of the modified membrane prior to MVI treatment. Gamma sterilization of the hydrophobic membrane(2.5–5.0 MRads) results in a material which is relatively unchanged in its properties prior to gamma irradiation; vent time <10 seconds(i.e. the time it takes to displace a fixed volume of air using a water head height of 50 inches), burst strength >19 psi's, and successful completion of the MVI test.

EXAMPLE 2

A microporous PVDF(polyvinylidene fluoride) membrane having an average pore size of 0.1 microns was dip-coated into a reactant solution containing 2.58 g of 3,3,4,4,5,5,6,6,7,7,8,8,9,9,10,10,10-heptadecafluorodecyl acrylate, 0.10 g 2,2-dimethoxy-2-phenylacetophenone, and 0.12 g of 1,6-hexanediol diacrylate dissolved in 47.21 g of HMDS. The coated membrane was sandwiched between two sheets of polyethylene and irradiated as described in Example 1 at a rate of approximately 8 ft./min. The membrane was rinsed with isopropanol and then methanol and dried at 135° C. for 2 hours. The weight add-on was approximately 9%. The modified PVDF membrane retained approximately 90% of its original air permeability. After a 96 hour MVI test exposure the modified membrane retained approximately 70–90% of its original air permeability.

EXAMPLE 3

A microporous regenerated cellulose membrane was dip-coated into a solution containing 5.10 g of 2-(N-ethylperfluorooctanesulfonamido)ethyl acrylate, 0.124 g of 2,2-dimethoxy-2-phenylacetophenone, and 0.50 g of 2,2,3,3,4,4,5,5-octafluorohexanediol-1,6-diacrylate dissolved in 95.50 g of HMDS. The coated membrane was sandwiched between polyethylene sheets and irradiated as described in Example 1 at a rate of approximately 15 ft./min. The membrane was rinsed with isopropanol and then methanol and air-dried overnight. The resulting hydrophobic membrane retains approximately 40% of its original air permeability after a 96 hour MVI test exposure.

Table 1 shows the wettability characteristics of representative polymeric membranes modified by the present methodology.

TABLE 1

Wettability Characteristics Of Some Modified Membranes[a]

| Substrate[b] | Wettability[c] |
|---|---|
| Polyethylene | ≦21 |
| Cellulose | ≦18 |
| Cellulose Acetate | ≦19 |
| Cellulose, Mixed Nitro & Acetate Esters | ≦19 |
| Polyamide (Nylon 66) | ≦18 |
| Polysulfone | ≧21 |
| Polytetrafluoroethylene | ≧27 |
| Polyester | ≦18 |
| Polyvinylidene Fluoride (PVDF) | ≦18 |
| Polypropylene | ≧21 |

[a]Modified as described in Examples 1 and 2.
[b]Porous membrane substrate.
[c]Wettability (dynes/cm) is meant as the minimum value of a solvent surface tension necessary to "wet" the membrance. Wetting is meant as the characteristic transparency, indicative of mass transport through the porous membrane, observed upon contact with a wetting solvent.

EXAMPLE 4

A microporous nylon(Nylon 66) membrane having an average pore size of 0.2 microns was dip-coated into a reactant solution containing 2.50 g of 2-(N-ethylperfluorooctanesulfonamido)ethyl acrylate, 0.04 g of 2,2-dimethoxy-2-phenylacetophenone, and 0.20 g of 2,2,3,3,4,4,5,5-octafluorohexanediol-1,6-diacrylate dissolved in 22.54 g of tert-butanol and 27.55 g of deionized water. The coated membrane was sandwiched between polyethylene sheets and irradiated as described in Example 1 at a rate of approximately 15 ft./min. The membrane was rinsed with isopropanol and then acetone and air-dried overnight. The weight add-on was approximately 5%. The modified membrane does not wet with water(surface tension approximately 72 dynes/cm), but wets with isopropanol and hexadecane, solvent surface tensions of approximately 21 dynes/cm and 27 dynes/cm, respectively. The modified membrane failed the MVI test immediately(minutes) due to seepage of the MVI solution through the membrane.

We claim:

1. A composite porous polymeric membrane which comprises a porous membrane substrate having an average pore size between about 0.001 and 10 microns formed of a first polymer, said substrate having a surface which is modified on its entire surface with a crosslinked second polymer formed from a polymerizable fluorine containing monomer, said monomer being polymerized and crosslinked in situ on said substrate, said second polymer having a wettability such that it does not wet with solvents whose surface tension is greater than about 21 dynes/cm and said composite porous membrane having essentially the same porous configuration as said porous membrane substrate.

2. A composite porous polymeric membrane which comprises a porous membrane substrate having an average pore size between about 0.001 and 10 microns formed of a first polymer, said substrate having a surface which is modified on its entire surface with a crosslinked second polymer formed from a polymerizable fluorine containing monomer, said monomer being polymerized and crosslinked in situ on said substrate, said second polymer having a wettability such that it passes the MVI test, and said composite porous membrane having essentially the same porous configuration as said porous membrane substrate.

3. The composite porous polymeric membrane of any one of claims 1 or 2 wherein the first polymer is a polyamide.

4. The composite porous polymeric membrane of any one of claims 1 or 2 wherein the first polymer is a fluorinated hydrocarbon polymer.

5. The composite porous polymeric membrane of any one of claims 1 or 2 wherein the first polymer is a cellulosic 6. The composite porous polymeric membrane of any one of claims 1 or 2 wherein the first polymer is polyvinylidene fluoride.

7. The composite porous polymeric membrane of any one of claims 1 or 2 wherein the first polymer is a polyolefinic hydrocarbon.

8. The composite porous polymeric membrane of any one of claims 1 or 2 wherein the first polymer is a polysulfone.

9. The composite porous polymeric membrane of any one of claims 1 or 2 wherein the first polymer is a polyester.

10. The composite porous polymeric membrane of any one of claims 1 or 2 wherein the first polymer is a polyurethane.

11. The composite porous polymeric membrane of any one of claims 1 or 2 wherein the first polymer is a polycarbonate.

12. The composite porous membrane of any one of claims 1 or 2 wherein said second polymer is formed from an ethylenically unsaturated monomer having at least one fluoroalkyl group.

13. The composite porous membrane of any one of claims 1 or 2 wherein the second polymer is formed from an ethylenically unsaturated monomer having at least one fluoroalkyl group in the presence of a crosslinking agent.

14. The composite porous product produced by any one of claims 1 or 2 having a burst strength as measured with an unsupported 13 millimeter diameter disk of said composites at least 10 psi in a forward direction and in a reverse direction after said composite is exposed to sterilizing ionizing radiation.

* * * * *